United States Patent
Raudies et al.

(10) Patent No.: US 11,023,910 B2
(45) Date of Patent: Jun. 1, 2021

(54) RECOMMENDING A BUDGET FOR AN ONLINE JOB POSTING UTILIZING MACHINE LEARNING FORECASTING

(71) Applicant: Microsoft Technology Licensing, LLC, Redmond, WA (US)

(72) Inventors: Florian Raudies, Mountain View, CA (US); Sumedha K. Swamy, San Jose, CA (US); Luthfur R. Chowdhury, San Jose, CA (US); Xi Chen, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 16/232,830

(22) Filed: Dec. 26, 2018

(65) Prior Publication Data

US 2020/0211041 A1 Jul. 2, 2020

(51) Int. Cl.
*G06Q 30/02* (2012.01)
*G06Q 10/10* (2012.01)
*G06N 20/00* (2019.01)

(52) U.S. Cl.
CPC ......... *G06Q 30/0206* (2013.01); *G06N 20/00* (2019.01); *G06Q 10/1053* (2013.01)

(58) Field of Classification Search
CPC .......... G06Q 10/1053; G06Q 30/0201; G06Q 30/0202; G06Q 10/04; G06Q 30/02; G06N 20/00
See application file for complete search history.

(56) References Cited

U.S. PATENT DOCUMENTS

| 5,164,897 | A | * | 11/1992 | Clark | G06Q 10/1053 705/321 |
| 5,978,768 | A | * | 11/1999 | McGovern | G06Q 10/1053 705/321 |
| 6,801,945 | B2 | * | 10/2004 | Lin | G06Q 10/04 709/229 |
| 7,555,441 | B2 | * | 6/2009 | Crow | G06Q 10/0631 705/7.14 |
| 8,843,388 | B1 | * | 9/2014 | Westfall | G06Q 10/063112 705/7.13 |
| 2006/0229899 | A1 | * | 10/2006 | Hyder | G06Q 10/10 705/1.1 |

(Continued)

OTHER PUBLICATIONS

Kumar, Rohit et al, Predicting Clicks: CTR Estimation of Advertising Using Logistic Regression IEEE, 2015 (Year: 2015).*

(Continued)

*Primary Examiner* — Scott L Jarrett
(74) *Attorney, Agent, or Firm* — Schwegman Lundberg & Woessner, P.A.

(57) ABSTRACT

The disclosed embodiments provide a system for forecasting job applications. During operation, the system applies a first machine learning model to features that include a budget for a job to predict a number of impressions of the job. Next, the system applies a second machine learning model to additional features for the job to estimate an application rate for the job. The system then determines a distribution of applications to the job based on the number of impressions and the application rate. Finally, the system outputs one or more values from the distribution of applications to the job as guidance for setting the budget for the job.

15 Claims, 5 Drawing Sheets

(56) References Cited

U.S. PATENT DOCUMENTS

| | | | | |
|---|---|---|---|---|
| 2010/0325059 | A1* | 12/2010 | Lappin | G06Q 30/02 |
| | | | | 705/321 |
| 2012/0173528 | A1* | 7/2012 | Kreindler | G06Q 10/1053 |
| | | | | 707/737 |
| 2013/0311244 | A1* | 11/2013 | Abotchie | G06Q 10/1053 |
| | | | | 705/7.39 |
| 2016/0092840 | A1* | 3/2016 | Vivas | G06Q 10/1053 |
| | | | | 705/321 |
| 2017/0221004 | A1* | 8/2017 | Kenthapadi | G06F 16/24578 |
| 2017/0221005 | A1* | 8/2017 | Kenthapadi | G06Q 10/1053 |
| 2018/0253433 | A1* | 9/2018 | Borisyuk | G06F 16/9535 |

OTHER PUBLICATIONS

Richardson, Matthew et al., Predicting Clicks: Estimating the Click-Through Rate for New Ads WWW 2007, May 8-12, 2007 (Year: 2007).*

Gupta, Sneha et al., An Approach to Predictive Analytics of Website Visitor Traffic and Pageviews International Journal of Computer Science and Applications, vol. 9, No. 1, Jan.-Mar. 2016 (Year: 2016).*

Makridakis, Spyros et al., Forecasting: Methods and Applications Wiley, Third Edition, Dec. 1997 (Year: 1997).*

Li, Jia et al., Forecasting Web Page Views: Methods and Observations Journal of Machine Learning Research, vol. 9, 2008 (Year: 2008).*

* cited by examiner

RECOMMENDING A BUDGET FOR AN ONLINE JOB POSTING UTILIZING MACHINE LEARNING FORECASTING

BACKGROUND

Field

The disclosed embodiments relate to forecasting models. More specifically, the disclosed embodiments relate to techniques for forecasting job applications.

Related Art

Online networks may include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

Figure 1:
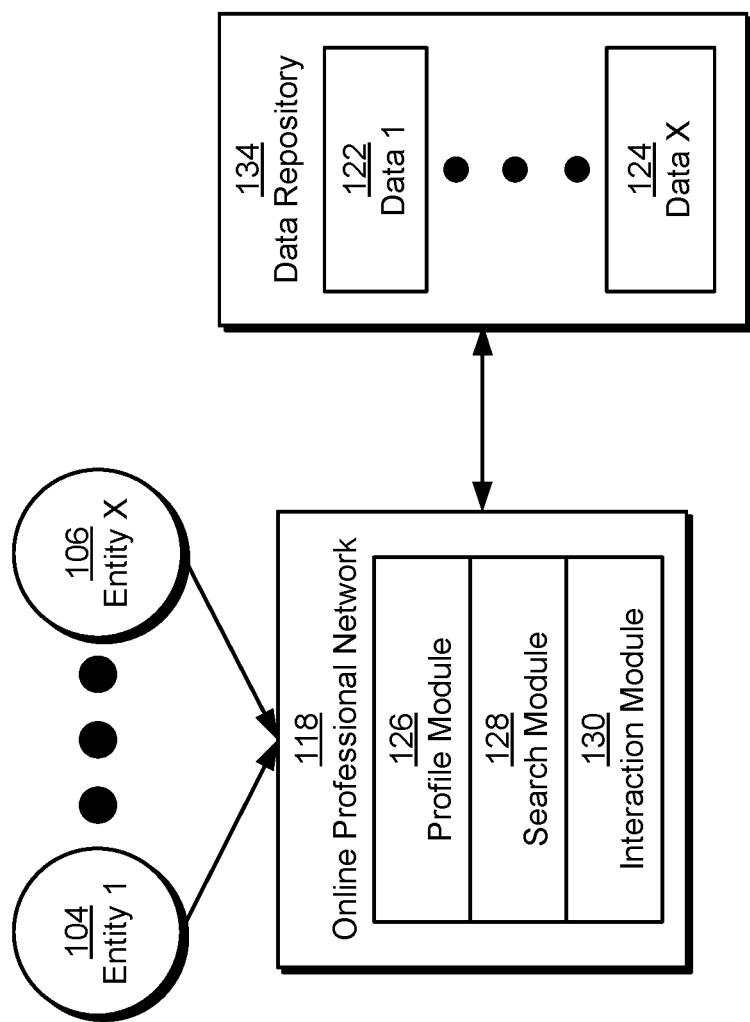
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for forecasting job applications for a given job post. The jobs are posted within an online system such as an online professional network and/or online marketplace. Each job is associated with a daily and/or other budget that is spent as users view, click on, apply to, and/or perform other actions related to the job. As a result, the rate at which users perform these actions may be affected by the budget set by the job's poster.

More specifically, the disclosed embodiments predict the number of applications (or applicants) for a job, given a budget for the job. The budget and/or other features of the job are inputted into one or more machine learning models to predict the number of impressions of the job (e.g., created by potential applicants of the job within the online system), as well as an application rate for the job. The number of impressions and the application rate are then combined in a Bayesian Poisson-Gamma state space model to produce a distribution of applications to the job, given the job's budget. For example, a Gamma distribution for the application rate may be approximated based on a mean and variance of the application rate. The distribution of applications to the job may then be generated as a negative binomial distribution that is parameterized using one or more parameters of the Gamma distribution and a Poisson rate for the number of impressions of the job.

One or more values from the distribution are then outputted as guidance for setting the job's budget. For example, an average value from the distribution may be displayed to a poster of the job as the forecasted number of applications to the job for a given value of the job's budget. In another example, values associated with the $10^{th}$ and $90^{th}$ percentiles in the distribution may be displayed to the job poster as lower and upper bounds for the number of applications to the job, given the job's budget.

By predicting numbers and/or rates of job applications based on budgets for the jobs and generating budgeting guidance based on the predictions, the disclosed embodiments may improve setting and/or utilization of the jobs' budgets. In contrast, conventional techniques may involve workflows for posting advertisements, jobs, and/or other types of content that lack such guidance and/or use heuristics to estimate applications or other actions based on the corresponding budgets. In turn, job posters may fail to set budgets that provide for adequate exposure of applicants to jobs, which may result in a failure to hire for the jobs and/or an inability to hire the best applicants for the jobs. The job posters may also, or instead, fail to post jobs due to lack of guidance on how to set budgets for the jobs. Consequently, the disclosed embodiments may provide improvements in computer systems, applications, user experiences, tools, and/or technologies related to delivering online content and/or carrying out activities within online systems.

Forecasting Job Applications

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that delivers, to the entities, the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

In one or more embodiments, data repository 134 stores data that represents standardized, organized, and/or classified attributes for the users or entities. For example, skills in data repository 134 may be organized into a hierarchical taxonomy. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized job functions such as "accounting," "consulting," "education," "engineering," "finance," "healthcare services," "information technology," "legal," "operations," "real estate," "research," and/or "sales." In a sixth example, data repository 134 includes standardized time periods (e.g., daily, weekly, monthly, quarterly, yearly, etc.) that can be used to retrieve other data that is represented by the time periods (e.g., starting a job in a given month or year, graduating from university within a five-year span, job listings posted within a two-week period, etc.).

Data in data repository 134 may be used to generate recommendations and/or other insights related to listings of jobs or opportunities within online network 118. For example, one or more components of online network 118 may track searches, clicks, views, text input, applications, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings related to candidates for jobs or opportunities listed within or outside online network 118. The candidates may include users who have viewed, searched for, or applied to jobs, positions, roles, and/or opportunities, within or outside online network 118. The candidates may also, or instead, include users and/or members of online network 118 with skills, work experience, and/or other attributes or qualifications that match the corresponding jobs, positions, roles, and/or opportunities.

After the candidates are identified, profile and/or activity data of the candidates may be inputted into the machine learning model(s), along with features and/or characteristics of the corresponding opportunities (e.g., required or desired skills, education, experience, industry, title, etc.). The machine learning model(s) may output scores representing the strengths of the candidates with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, etc.).

In turn, ranking or thresholding based on the scores and/or associated insights may improve the quality of the candidates and/or recommendations of opportunities to the candidates, increase user activity with online network 118, and/or guide the decisions of the candidates and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

Jobs, advertisements, and/or other types of content displayed or delivered within online network 118 may also be associated with budgetary constraints. For example, posters of jobs may pay per view, click, application, and/or other action taken with respect to the jobs by members of online network 118. The posters may set daily budgets for the jobs, from which costs are deducted as the members take the corresponding actions with the jobs. After a job's daily budget is depleted, the job's position in search results, rankings, and/or recommendations may be decreased for the remainder of the day. As a result, the visibility of the job, the level of interaction between candidates and the job, and/or the ability to effectively hire for the job may be influenced by the budget set for the job.

Figure 2:
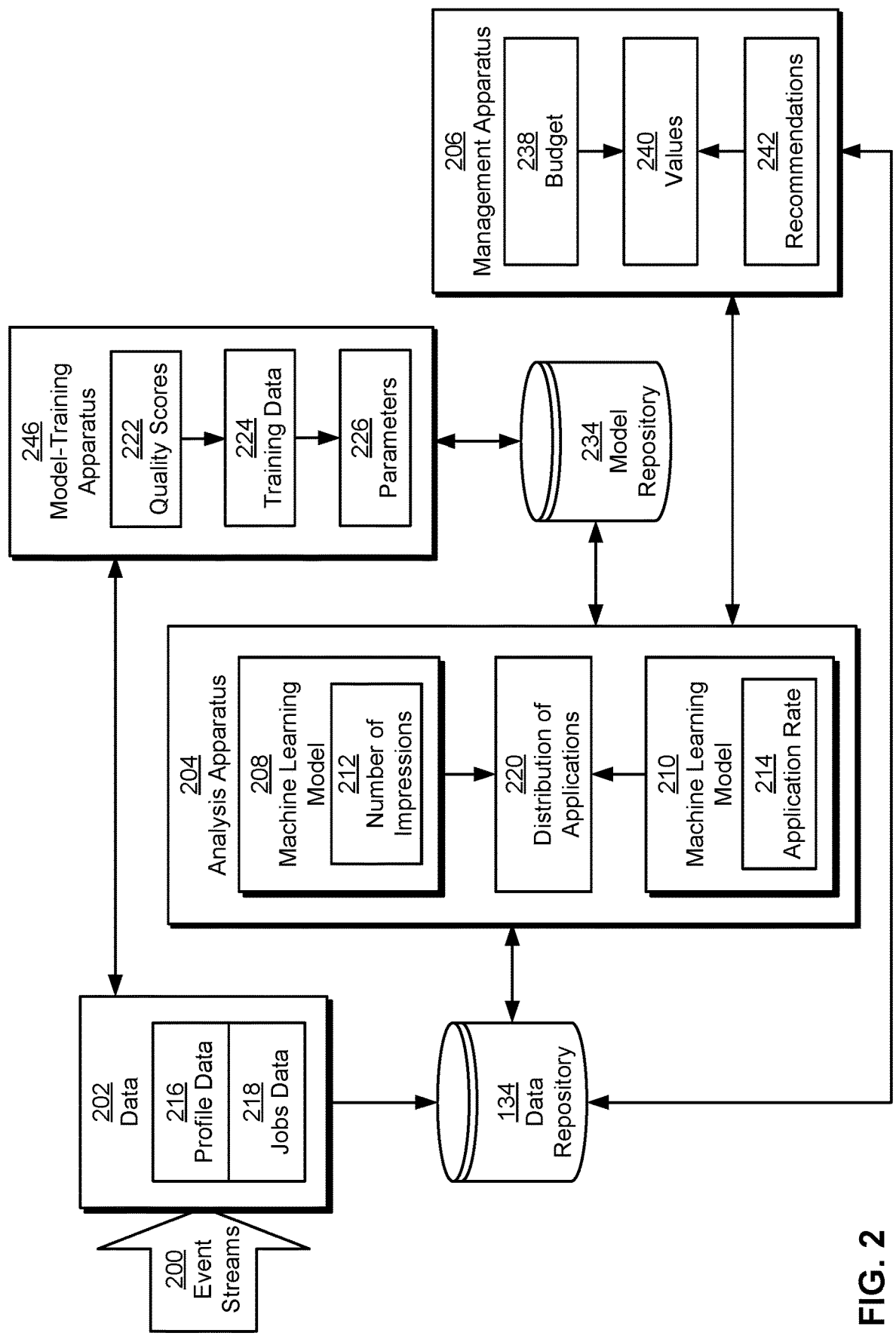
FIG. 2 shows a system for forecasting job applications in accordance with the disclosed embodiments.

In one or more embodiments, online network 118 includes functionality to improve budgeting of jobs by forecasting the number of applications to a job based on the job's budget and generating guidance to job posters based on the forecasted number of applications. As shown in FIG. 2, data repository 134 and/or another primary data store may be queried for data 202 that includes profile data 216 for members of an online system (e.g., online network 118 of FIG. 1), as well as jobs data 218 for jobs that are listed or described within or outside the online system.

Profile data 216 includes data associated with member profiles in the online system. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, and/or other data related to the user's interaction with the online system.

Attributes of the members from profile data 216 may be matched to a number of member segments, with each member segment containing a group of members that share one or more common attributes. For example, member segments in the online system may be defined to include members with the same industry, title, location, and/or language.

Connection information in profile data 216 may additionally be combined into a graph, with nodes in the graph representing entities (e.g., users, schools, companies, locations, etc.) in the online system. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 includes structured and/or unstructured data for job listings and/or job descriptions that are posted and/or provided by members of the online system and/or external entities. For example, jobs data 218 for a given job or job listing may include a declared or inferred title, company, required or desired skills, responsibilities, qualifications, role, location, industry, seniority, salary range, benefits, and/or member segment.

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

An analysis apparatus 204 uses data in data repository 134 to estimate a distribution of applications 220 for a job, given a budget 238 for the job. In particular, analysis apparatus 204 applies a first machine learning model 208 to a value of budget 238 and/or other features related to the job from data repository 134 to predict a number of impressions 212 of the job. Analysis apparatus 204 also applies a second machine learning model 210 to a different set of features to predict an application rate 214 for the job. Analysis apparatus 204 then combines number of impressions 212 and application rate 214 into a distribution of applications 220 for the job, given the value of budget 238.

For example, machine learning model 208 may include a Poisson regression model that estimates a Poisson rate for number of impressions 212. As a result, machine learning model 208 may have the following representation:

$$i_{jt} \sim Poi(\lambda_{jt}), \log(\lambda_{jt}) = X_{jt}\beta$$

In the above representation, $i_{jt}$ represents number of impressions 212 for a job j at time t, which has a Poisson distribution with rate parameter $\lambda_{jt}$. The Poisson regression model estimates the rate parameter as a function of regression covariates $X_{jt}$ and coefficients β. The covariates may include the day of the week on which the job was posted and/or a number of days since the job was posted. The covariates may also, or instead, include features related to the job, such as the job's location, company, function, industry, and/or minimum or maximum level of experience. The covariates may also, or instead, include a source of applications for the job (e.g., a jobs module or other onsite source within the online system or a company website or another offsite source that is external to the online system) and/or a payment model for the job (e.g., pay per click (PPC) or a prepaid fixed price throughout the job's lifetime).

Continuing with the example, machine learning model 210 may include a log-linear regression model that estimates application rate 214 based on features related to the job. As a result, machine learning model 210 may include the following representation:

$$\log(\tilde{\gamma}_{jt}) = x_{jt}^T \beta_j + \varepsilon_{jt},$$

$$\tilde{\gamma}_{jt} = a_{jt}/\hat{\lambda}_{jt}$$

In the above representation, $\tilde{\gamma}_{jt}$ represents an estimate of application rate 214 for job j at time t, which is calculated as the number of applications $a_{jt}$ divided by an estimated number of impressions 212 $\hat{\lambda}_{jt}$. The log-linear regression model estimates the logarithm of application rate 214 based on covariates $x_{jt}^T$, coefficients $\beta_j$, and measurement errors $\varepsilon_{jt}$. The covariates may include, but are not limited to, the job's function, industry, and/or level of experience.

A Bayesian Poisson-Gamma state space model may then be used to generate distribution of applications 220 based on the estimated number of impressions 212 and application rate 214:

$$a_{jt}|\lambda_{jt}, \gamma_j \sim Poi(\gamma_j \lambda_{jt})$$

$$\gamma_j \sim Gamma(c_j, d_j)$$

In other words, the number of applications to the job, given number of impressions 212 and application rate 214, may have a Poisson distribution and a Gamma-distributed prior $\gamma_j$.

The mean and variance of the logarithm of application rate 214 may be calculated as:

$$f_j = E(\log \gamma_j) = \phi_0(c_j) - \log d_j$$

$$q_j = V(\log \gamma_j) = \phi_1(c_j),$$

where $f_j$ is the mean of the logarithm of application rate 214, $q_1$ is the variance of the logarithm of application rate 214, $\phi_0$ is the digamma function, and $\phi_1$ is the trigamma function.

The Newton-Raphson method may be used with the expressions above to approximate $c_1$ and $d_1$ in an iterative fashion:

$$c_{j,n+1} = c_{j,n} - \frac{\phi_1(c_{j,n}) - q_j}{\phi_2(c_{j,n})}$$

$$d_j = \exp\{\phi_0(c_j) - f_j\},$$

where $\phi_2$ is the polygamma function of order 2.

Finally, the Gamma-distributed application rate 214 $\gamma_j$ may be marginalized out to obtain the marginal distribution of applications 220 as a negative binomial distribution with the following form:

$$a_j \sim NB\left(c_j, \frac{\sum_{t=1:T} \hat{\lambda}_{jt}}{\sum_{t=1:T} \hat{\lambda}_{jt} + d_j}\right)$$

A model-training apparatus 246 uses historical data 202 from data repository 134 as training data 224 for updating parameters 226 of one or both machine learning models 208-210. For example, model-training apparatus 246 may input budgets, impression counts, and job features for previously posted jobs into machine learning model 208 and update parameters 226 of machine learning model 208 so that machine learning model 208 predicts the impression counts based on the corresponding budgets and job features. In another example, model-training apparatus 246 may input application rates and job features for previously posted jobs into machine learning model 210 and update parameters 226 of machine learning model 210 so that machine learning model 210 predicts the application rates based on the corresponding job features.

In one or more embodiments, model-training apparatus 246 generates and/or filters training data 224 used to update parameters 226 of one or both machine learning models 208-210 based on quality scores 222 associated with the corresponding job applicants. Quality scores 222 may represent a measure of "quality" for a set of applicants with respect to a corresponding set of jobs, with a higher quality score indicating a more desirable or suitable applicant for a job and a lower quality score indicating a less desirable or suitable applicant for a job. In some embodiments, desirable is defined as desirable to the job poster.

Model-training apparatus 246 calculates quality scores 222 for historical applicants of jobs based on attributes of the applicants and jobs. For example, model-training apparatus 246 may calculate match scores between a set of attributes for each applicant and a corresponding set of attributes for a job (e.g., a job viewed by the applicant and/or for which an application from the applicant was received). The match scores may characterize the degree to which the applicant's educational background, function, location, level of experience, industry, and/or set of skills matches those of the job. The match scores may then be combined with a set of weights to produce a quality score for the applicant with respect to the job.

Model-training apparatus 246 then applies a threshold and/or rank ordering to the quality scores 222 to identify a subset of applicants as "quality" applicants for the corresponding jobs and inputs training data 224 for the identified applicants into one or both machine learning models 208-210. Model-training apparatus 246 may thus train machine learning model 208 to predict numbers of impressions for quality applicants of jobs and/or train machine learning model 208 to predict application rates of quality applicants of jobs. In turn, subsequent use of machine learning models 208-210 by analysis apparatus 204 may result in estimates of number of impressions 212, application rate 214, and/or distribution of applications 220 associated with quality applicants for a given job instead of all applicants for the job.

Model-training apparatus 246 may also, or instead, omit the use of quality scores 222 in generating and/or selecting training data 224 for one or both machine learning models 208-210. Consequently, machine learning models 208-210 may be trained to predict a number of impressions 212 and/or application rate 214 for all applicants of a given job, and distribution of applications 220 may also be predicted for all applicants of the job.

A management apparatus 206 uses output of analysis apparatus 204 to guide the selection and/or updating of budget 238. First, management apparatus 206 may output one or more values 240 from distribution of applications 220 as guidance for selecting budget 238. For example, management apparatus 206 may provide a user interface that guides a job poster through a workflow for posting a job and/or for managing a previously posted job. Within the user interface, management apparatus 206 may display the value of budget 238 used to generate a given distribution of applications 220 for a job, as well as the mean of the distribution as the forecasted number of applications to the job given the displayed value of budget 238. Management apparatus 206 may also, or instead, display values 240 for the $10^{th}$ percentile and $90^{th}$ percentile of distribution of applications 220 (or some other quantiles) as lower and upper bounds for the forecasted number of applications.

Management apparatus 206 may also provide user-interface elements within the user interface for adjusting budget 238. When a new value of budget 238 is specified through the user interface, management apparatus 206 may transmit the value to analysis apparatus 204, and analysis apparatus 204 may generate new estimates of number of impressions 212, application rate 214, and distribution of applications 220 based on the value. In turn, management apparatus 206 may update values 240 representing the forecasted number of applications for the job to reflect the change in budget 238. A poster of the job may thus interact with the user interface to identify and/or set a value of budget 238 that produces the desired number or range of applications to the job.

Second, management apparatus 206 may output recommendations 242 related to values 240 and/or budget 238. For example, management apparatus 206 may display a "likelihood of hire" associated with the forecasted number of applications to the job. When the likelihood is low, management apparatus 206 may suggest an amount by which budget 238 should be increased to improve the chances of hiring an employee for the job.

By predicting numbers and/or rates of job applications based on budgets for the jobs and generating budgeting guidance based on the predictions, the disclosed embodiments may improve setting and/or utilization of the jobs' budgets. In contrast, conventional techniques may involve workflows for posting advertisements, jobs, and/or other types of content that lack such guidance and/or use heuristics to estimate applications or other actions based on the corresponding budgets. Consequently, the disclosed embodiments may provide improvements in computer systems, applications, user experiences, tools, and/or technologies related to delivering online content and/or carrying out activities within online systems.

Those skilled in the art will appreciate that the system of FIG. 2 may be implemented in a variety of ways. First, analysis apparatus 204, management apparatus 206, model-training apparatus 246, and data repository 134 may be provided by a single physical machine, multiple computer systems, one or more virtual machines, a grid, one or more databases, one or more filesystems, and/or a cloud computing system. Analysis apparatus 204, management apparatus 206, and model-training apparatus 246 may additionally be implemented together and/or separately by one or more hardware and/or software components and/or layers.

Second, a number of techniques may be used to estimate number of impressions 212, application rate 214, and/or distribution of applications 220. For example, the functionality of analysis apparatus 204 and/or machine learning models 208-210 may be provided by one or more regression models, artificial neural networks, support vector machines, decision trees, naïve Bayes classifiers, Bayesian networks, random forests, gradient boosted trees, deep learning models, hierarchical models, and/or ensemble models.

Third, the functionality of the system may be adapted to various types of content and/or pricing. For example, the system may be used to predict actions related to advertisements, posts, images, audio, video, and/or other types of online content based on budgets for the content.

Figure 3:
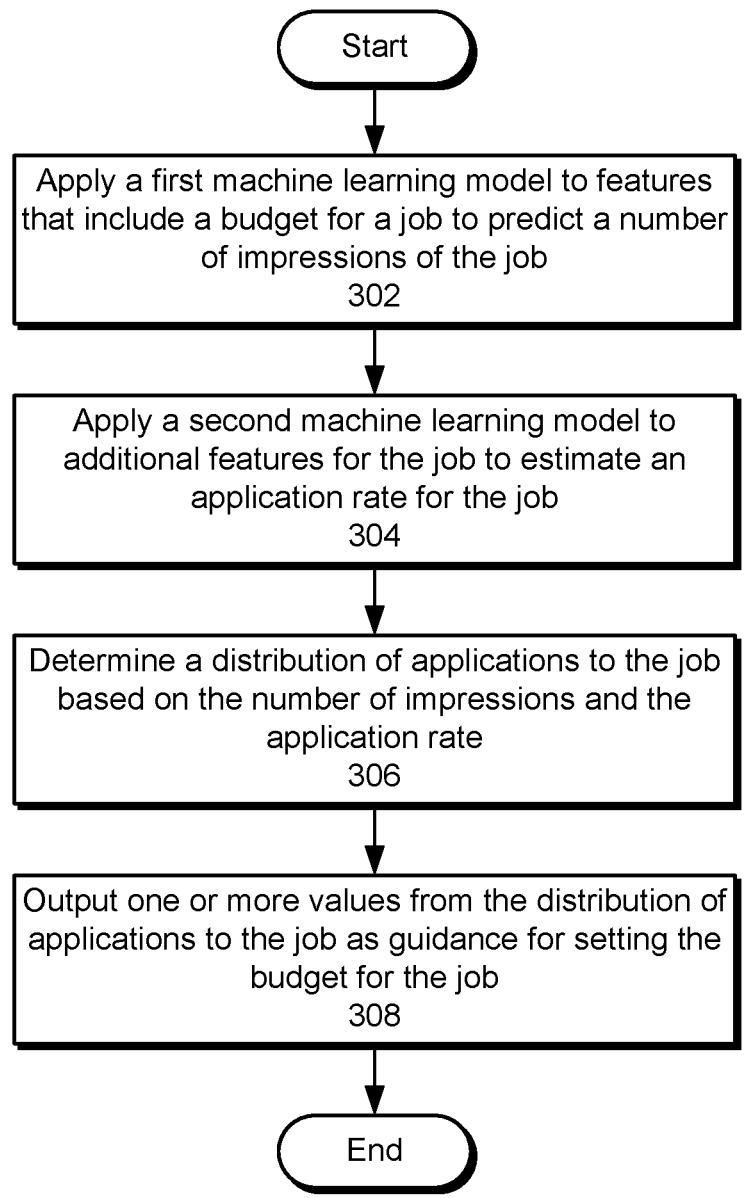
FIG. 3 shows a flowchart illustrating a process of forecasting job applications in accordance with the disclosed embodiments.

FIG. 3 shows a flowchart illustrating a process of forecasting job applications in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a first machine learning model is applied to features that include a budget for a job to predict a number of impressions of the job (operation 302). For example, the first machine learning model may include a Poisson regression model that estimates the Poisson rate for the number of impressions based on the budget of the job, the day of the week on which the job was originally posted, a number of days since the job was posted, features related to the job (e.g., the job's location, company, function, industry, level of experience), a source of applications for the job, a payment model for the job, and/or a cross product of two other features (e.g., a cross product of the job's function and industry).

Next, a second machine learning model is applied to additional features for the job to estimate an application rate for the job (operation 304). For example, the second machine learning model may include a log-linear regression model that estimates the application rate for the job based on the job's function, industry, and/or level of experience.

A distribution of applications to the job is then determined based on the number of impressions and the application rate (operation 306).

For example, a Gamma distribution for the application rate may be approximated based on a mean and a variance of the application rate, and the distribution of applications to the job may be generated as a negative binomial distribution based on one or more parameters of the Gamma distribution and a Poisson rate for the number of impressions.

Finally, one or more values from the distribution of applications to the job are outputted as guidance for setting the budget of the job (operation 308). For example, an average value from the distribution may be displayed to a poster of the job as the forecasted number of applications to the job for a given value of the job's budget. In another example, values associated with the $10^{th}$ and $90^{th}$ percentiles in the distribution (and/or other quantiles in the distribution) may be displayed to the job poster as lower and upper bounds for the number of applications to the job, given the job's budget. In a third example, a visual representation of the distribution of applications (e.g., a plot of the distribution's probability mass function) may be displayed to the job's poster. The visual representation may be updated as the poster interacts with a slider, dial, text field, and/or other user-interface element for specifying the job's budget.

Figure 4:
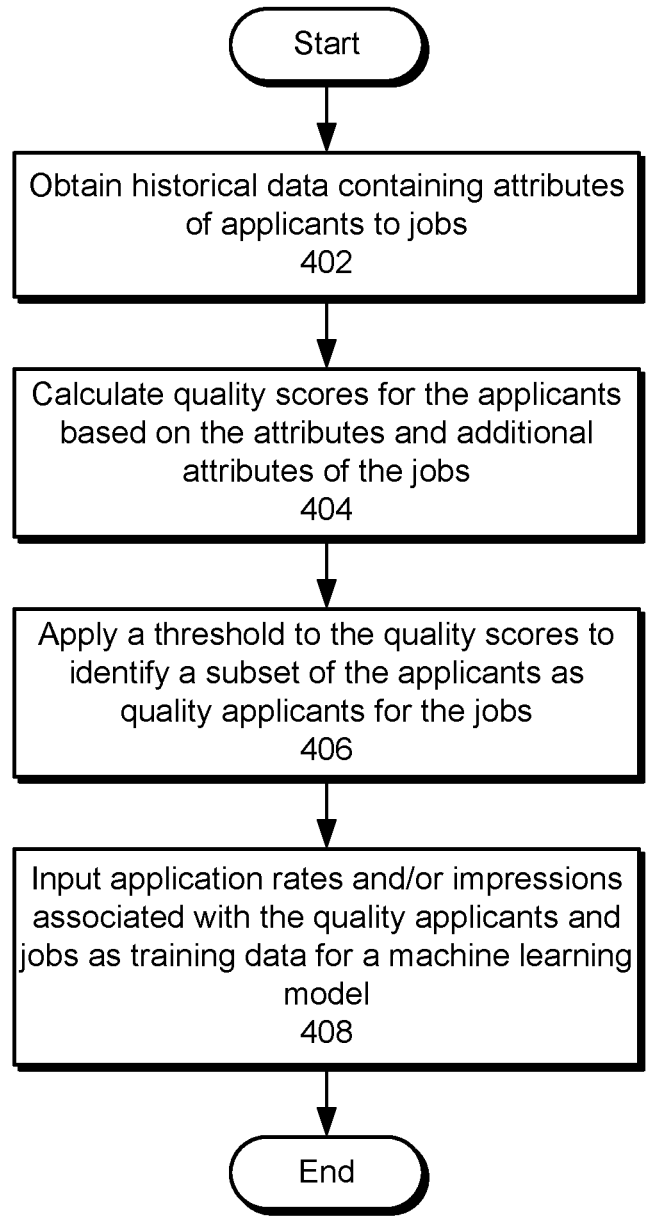
FIG. 4 shows a flowchart illustrating a process of creating a machine learning model to forecast quality applicants in accordance with the disclosed embodiments.

FIG. 4 shows a flowchart illustrating a process of creating a machine learning model in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, historical data containing attributes of applicants to jobs is obtained (operation 402). For example, the attributes may include an educational background, function, location, level of experience, industry, and/or a set of skills for each applicant. Next, quality scores for the applicants are calculated based on the attributes and additional attributes of the jobs (operation 404). For example, match scores between the attributes of the applicants and corresponding attributes of the jobs may be calculated and combined with a set of weights to produce the quality scores. As a result, each quality score may reflect the extent to which qualifications and/or requirements for a job are met by a corresponding applicant.

A threshold or rank order is applied to the quality scores to identify a subset of the applicants as quality applicants for the jobs (operation 406). For example, the threshold may represent a percentile associated with the quality scores (e.g., the top 20% of quality scores using rank order or applicants that match to 80% of the job post) and/or a numeric quality score value, and applicants with quality scores that exceed the threshold may be identified as quality applicants.

Finally, application rates and/or impressions associated with the quality applicants and jobs are inputted as training data for a machine learning model (operation 408). In turn, the machine learning model may learn to predict application rates and/or impressions of jobs by quality applicants.

Figure 5:
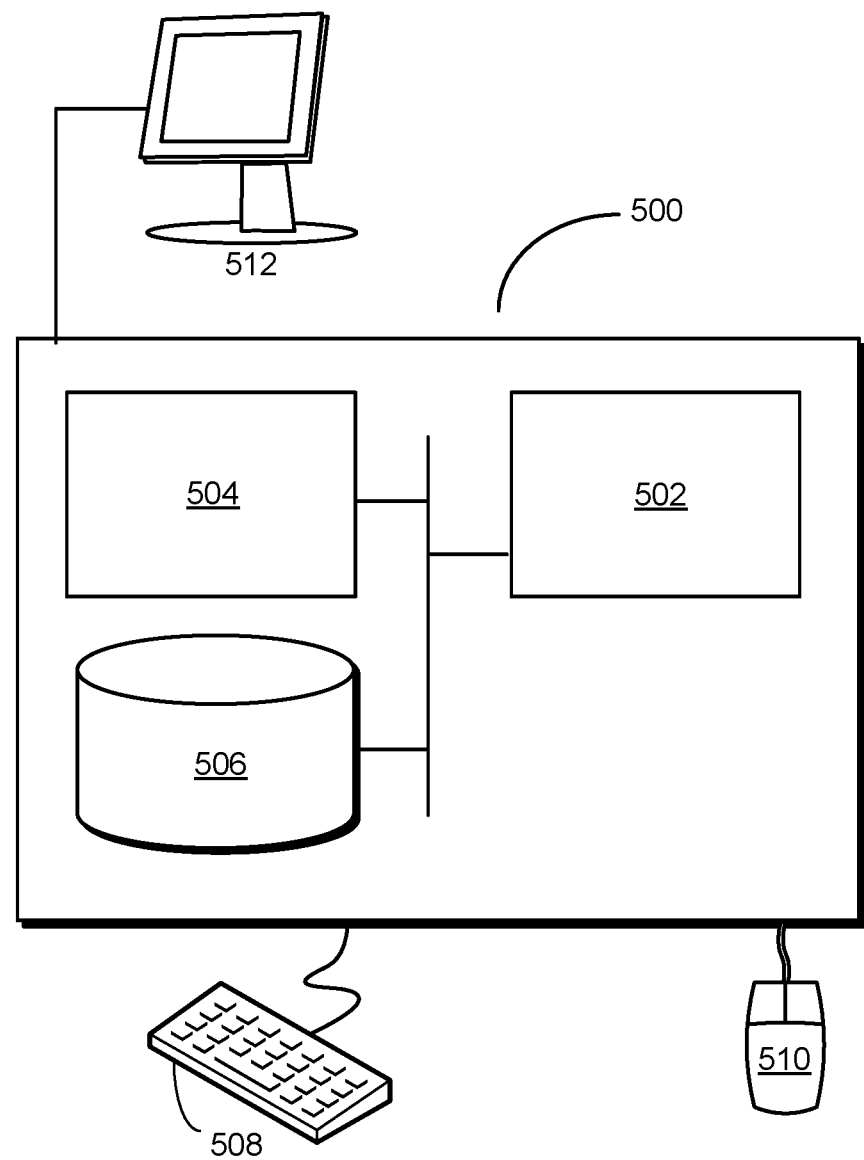
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for forecasting job applications. The system includes an analysis apparatus and a management apparatus, one or more of which may alternatively be termed or implemented as a module, mechanism, or other type of system component. The analysis apparatus applies a first machine learning model to features that include a budget for a job to predict a number of impressions of the job. Next, the analysis apparatus applies a second machine learning model to additional features for the job to estimate an application rate for the job. The analysis apparatus then determines a distribution of applications to the job based on the number of impressions and the application rate. Finally, the management apparatus outputs one or more values from the distribution of applications to the job as guidance for setting the budget for the job.

In addition, one or more components of computer system 500 may be remotely located and connected to the other components over a network. Portions of the present embodiments (e.g., analysis apparatus, management apparatus, model-training apparatus, data repository, online network, etc.) may also be located on different nodes of a distributed system that implements the embodiments. For example, the present embodiments may be implemented using a cloud computing system that predicts applications to jobs by a set of remote users based on budgets for the jobs.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for predicting a number of job applicants for an online job posting posted to a job hosting service, the method comprising:

training, by a machine learning algorithm executing on one or more computer systems of the job hosting service, a Poisson regression model to predict a rate of expected impressions for an online job posting based on a first set of features, the first set of features comprising an initial budget for the online job posting as set by an end-user, a date when the online job posting was posted, a location of the job described in the online job posting, a company offering the job described in the online job posting, and a function associated with the job described in the online job posting, wherein training data used in training the Poisson regression model is obtained from a data repository storing historical data about previously posted online job postings;

training, by a machine learning algorithm executing on one or more computer systems of the job hosting service, a log-linear regression model to estimate a rate at which job applications will be received for an online job posting based on a second set of features, the second set of features comprising a function associated with the job described in the online job posting, an industry associated with the job described in the online job posting, and a level of skill associated with the job described in the online job posting, wherein training data used in training the log-linear regression model is obtained from a data repository storing historical data about previously posted online job postings;

generating a first online job posting at the job hosting service with information received via a client computing device;

applying, by one or more computer systems of the job hosting service, the Poisson regression model to features associated with the first online job posting to predict a number of expected impressions of the first online job posting, the features comprising at least an initial budget as set by an end-user for the first online job posting;

applying, by the one or more computer systems of the job hosting service, a log-linear model to features associated with the first online job posting to estimate a rate at which applications will be received for the online job posting;

determining, by the one or more computer systems, a distribution of expected applications that will be received for the job described in the first online job posting, based on the predicted number of impressions and the estimated rate at which applications will be received;

causing presentation of a user interface that includes at least one value selected from the distribution of expected applications that will be received for the first online job posting along with a recommended budget that corresponds with the at least one selected value; and receiving input via the user interface indicating the initial budget for the online job posting is to be replaced with the recommended budget.

2. The method of claim 1, further comprising:
obtaining historical data comprising attributes of job applicants to jobs described in online job postings;
calculating quality scores for the job applicants based on the attributes and additional attributes of the online job postings;
comparing the quality scores for the job applicants with a threshold to identify a subset of the job applicants as quality applicants; and
inputting as a feature of the second set of features application rates associated with the quality applicants for training the log-linear regression model.

3. The method of claim 2, wherein calculating the quality scores for the job applicants comprises:
calculating match scores between the attributes of the job applicants and the additional attributes of the online job postings; and
combining the match scores with a set of weights to produce the quality scores.

4. The method of claim 3, wherein the attributes of the job applicants and the additional attributes of the online job postings comprise at least one of:
an educational background;
a function;
a location;
a minimum level of experience;
a maximum level of experience;
an industry; and
a set of skills.

5. The method of claim 1, wherein determining the distribution of expected applications that will be received for the job described in the first online job posting based on the predicted number of impressions and the estimated rate at which applications will be received comprises:
approximating a Gamma distribution for the application rate based on a mean and a variance of the application rate; and
generating the distribution of applications to the job described in the first online job posting based on one or more parameters of the Gamma distribution and a Poisson rate for the number of expected impressions.

6. The method of claim 5, wherein the distribution of expected applications that will be received for the first online job posting comprises a negative binomial distribution.

7. The method of claim 1, wherein the at least one value comprises one or more quantiles from the distribution of expected applications that will be received for the first online job posting.

8. The method of claim 1, wherein the first set of features further comprise at least one of:
a day of the week;
a number of days since the job was posted;
a job industry;
a level of experience;
a source of applications for the job;
a payment model for the job; and
a cross product of two features.

9. A system, comprising:
one or more processors; and
memory storing instructions that, when executed by the one or more processors, cause the system to:
with a machine learning algorithm, train a Poisson regression model to predict a rate of expected impressions for an online job posting based on a first set of features, the first set of features comprising an initial budget for the online job posting as set by an end-user, a date when the online job posting was posted, a location of the job described in the online job posting, a company offering the job described in the online job posting, and a function associated with the job described in the online job posting, wherein training data used in training the Poisson regression model is obtained from a data repository storing historical data about previously posted online job postings;
with a machine learning algorithm, train a log-linear regression model to estimate a rate at which job applications will be received for an online job posting based on a second set of features, the second set of features comprising a function associated with the job described in the online job posting, an industry associated with the job described in the online job posting, and a level of skill associated with the job described in the online job posting, wherein training data used in training the log-linear regression model is obtained from a data repository storing historical data about previously posted online job postings;
generate a first online job posting at the job hosting service with information received via a client computing device apply the Poisson regression model to features associated with the first online job posting to predict a number of expected impressions of the first online job posting, the features comprising at least an initial budget as set by an end-user for the first online job posting;

apply a log-linear model to features associated with the first online job posting to estimate a rate at which applications will be received for the online job posting;

determine a distribution of expected applications that will be received for the job described in the first online job posting, based on the predicted number of impressions and the estimated rate at which applications will be received; and cause presentation of a user interface that includes at least one value selected from the distribution of expected applications that will be received for the first online job posting along with a recommended budget that corresponds with the at least one selected value; and receive input via the user interface indicating the initial budget for the online job posting is to be replaced with the recommended budget.

10. The system of claim 9, wherein the memory further stores instructions that, when executed by the one or more processors, cause the system to:

obtain historical data comprising attributes of job applicants to jobs described in online job postings;

calculate quality scores for the job applicants based on the attributes and additional attributes of the online job postings;

compare the quality scores for the job applicants with a threshold to identify a subset of the job applicants as quality applicants; and input as a features of the first set of features and/or the second set of features for training the Poisson regression model and/or the log-linear regression model.

11. The system of claim 10, wherein calculating the quality scores for the job applicants comprises:

calculating match scores between the attributes of the job applicants and the additional attributes of the online job postings; and combining the match scores with a set of weights to produce the quality scores.

12. The system of claim 9, wherein determining the distribution of expected applications that will be received for the job described in the first online job posting based on the predicted number of impressions and the expected rate at which applications will be received, comprises:

approximating a Gamma distribution for the application rate based on a mean and a variance of the application rate; and generating the distribution of applications to the job described in the first online job posting based on one or more parameters of the Gamma distribution and a Poisson rate for the number of expected impressions.

13. The system of claim 9, wherein the distribution of expected applications that will be received for the first online job posting comprises a negative binomial distribution.

14. The system of claim 9, wherein the features further comprise at least one of:

a day of the week;
a number of days since the job was posted;
a job industry;
a level of experience;
a source of applications for the job;
a payment model for the job; and
a cross product of two features.

15. A non-transitory computer-readable storage medium storing instructions that when executed by a computer cause the computer to perform a method, the method comprising:

training, with a machine learning algorithm, a Poisson regression model to predict a rate of expected impressions for an online job posting based on a first set of features, the first set of features comprising an initial budget for the online job posting as set by an end-user, a date when the online job posting was posted, a location of the job described in the online job posting, a company offering the job described in the online job posting, and a function associated with the job described in the online job posting, wherein training data used in training the Poisson regression model is obtained from a data repository storing historical data about previously posted online job postings;

training, with a machine learning algorithm, a log-linear regression model to estimate a rate at which job applications will be received for an online job posting based on a second set of features, the second set of features comprising a function associated with the job described in the online job posting, an industry associated with the job described in the online job posting, and a level of skill associated with the job described in the online job posting, wherein training data used in training the log-linear regression model is obtained from a data repository storing historical data about previously posted online job postings;

generating a first online job posting at the job hosting service with information received via a client computing device;

applying, by one or more computer systems of the job hosting service, the Poisson regression model to features associated with the first online job posting to predict a number of expected impressions of the first online job posting, the features comprising at least an initial budget as set by an end-user for the first online job posting;

applying, by the one or more computer systems of the job hosting service, a log-linear model to features associated with the first online job posting to estimate a rate at which applications will be received for the online job posting;

determining, by the one or more computer systems, a distribution of expected applications that will be received for the job described in the first online job posting, based on the predicted number of impressions and the estimated rate at which applications will be received;

causing presentation of a user interface that includes at least one value selected from the distribution of expected applications that will be received for the first online job posting along with a recommended budget that corresponds with the at least one selected value; and receiving input via the user interface indicating the initial budget for the online job posting is to be replaced with the recommended budget.

\* \* \* \* \*